United States Patent
Griesser et al.

(10) Patent No.: US 6,826,462 B2
(45) Date of Patent: Nov. 30, 2004

(54) SYSTEM FOR DETECTING A DROP IN TIRE PRESSURE

(75) Inventors: Martin Griesser, Eschborn (DE); Hans Georg Ihrig, Darmstadt (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 10/181,133

(22) PCT Filed: Jan. 11, 2001

(86) PCT No.: PCT/EP01/00266
§ 371 (c)(1), (2), (4) Date: Jul. 12, 2002

(87) PCT Pub. No.: WO01/51298
PCT Pub. Date: Jul. 19, 2001

(65) Prior Publication Data
US 2003/0048179 A1 Mar. 13, 2003

(30) Foreign Application Priority Data
Jan. 14, 2000 (DE) .......................... 100 01 221
Sep. 7, 2000 (DE) .......................... 100 44 114

(51) Int. Cl.$^7$ ............................................. B60C 23/06
(52) U.S. Cl. ................................... 701/29; 340/442
(58) Field of Search ........................ 701/29, 36, 45, 701/1, 79; 340/442, 444; 303/191; 73/146.2

(56) References Cited

U.S. PATENT DOCUMENTS

| | | | | |
|---|---|---|---|---|
| 5,252,946 A | * | 10/1993 | Walker et al. | 340/444 |
| 5,591,906 A | * | 1/1997 | Okawa et al. | 73/146.5 |
| 5,721,374 A | * | 2/1998 | Siekkinen et al. | 73/146.2 |
| 5,783,991 A | * | 7/1998 | Jones | 340/444 |
| 5,838,230 A | * | 11/1998 | Jones | 340/444 |
| 5,929,756 A | * | 7/1999 | Randazzo et al. | 340/444 |
| 6,055,488 A | * | 4/2000 | Nakajima | 702/96 |

FOREIGN PATENT DOCUMENTS

| | | |
|---|---|---|
| DE | 4327492 | 2/1995 |
| DE | 19712097 | 4/1998 |
| DE | 19721480 | 11/1998 |
| DE | 19961681 | 10/2000 |
| EP | 0 489 562 | 6/1992 |
| EP | 0 489 563 | 6/1992 |
| EP | 0 579 446 | 1/1994 |
| EP | 0 844 112 | 5/1998 |
| JP | 10-230717 | * 9/1998 |

* cited by examiner

Primary Examiner—Michael J. Zanelli
(74) Attorney, Agent, or Firm—Honigman, Miller, Schwartz and Cohn LLP

(57) ABSTRACT

The present invention describes a method for detecting a tire pressure drop in motor vehicle tires by comparing ratios of tire pressures from select pairs of vehicle tires and detecting a preliminary pressure drop by checking whether at least one reference value includes a predetermined minimum difference from a nominal value for this reference value.

7 Claims, 2 Drawing Sheets

SYSTEM FOR DETECTING A DROP IN TIRE PRESSURE

TECHNICAL FIELD

The present invention generally relates to a pressure detection system and more particularly relates to a method of detecting tire pressure drop in motor vehicles and a device for controlling the brake force or the driving dynamics.

BACKGROUND OF THE INVENTION

Motor vehicles equipped with an electronic system for brake pressure control or for the control of driving dynamics (ABS, TCS, ESP, etc.) usually include devices for measuring the angular velocity of the vehicle wheels, such as wheel speed sensors. It is already known in the art that observing a change in the angular velocity of the wheels is appropriate for detecting a pressure drop in tires because in the event of tire pressure drop the dynamic rolling circumference and, thus, the so-called dynamic wheel radius decreases. In addition, what is common with electronic brake pressure control systems, the current driving situation can be determined from the variation of the input data and, as the case may be, stored wheel speed data. Pressure drop detection may be performed most simply during driving situations with little influence on the difference of the wheel speeds, e.g. during straight travel without a force acting on the vehicle (longitudinal acceleration, transverse acceleration, yaw rate).

To achieve pressure drop detection with an increased accuracy especially in dynamic driving maneuvers, a method is disclosed in German patent application 199 61 681 wherein additional physical data such as yaw rate, acceleration, brake application, engine torque, etc., is included in the detection algorithm for pressure drop detection so that pressure drop detection can be carried out also during dynamic driving maneuvers.

In DE 197 21 480 A1 a pressure drop detection method which can be integrated into an electronic anti-lock system (ABS) is described, wherein after actuation of a reset switch which is triggered as soon as the nominal pressure of the wheels is set, a learning period within time limits is initially executed in which a microcontroller monitors wheel angle speeds in consideration of the driving situation and determines top and bottom limit values ($G_1$ and $G_2$) from the time variation of the reference values calculated from the wheel angle speeds. Following the learning period is a period of comparison during which a check is made whether the currently determined reference values lie within the range defined by the learnt limit values.

The method takes into account the current driving situation by excluding reference values that result from inappropriate dynamic driving situations during the learning period and during the period of comparison.

Although various methods of detecting pressure drop by evaluating the wheel speed have already been disclosed, there is still the necessity to carry out pressure drop detection on the basis of wheel speed data in a still more reliable fashion, in particular to prevent undesirable wrong failure signalings as they may occur on e.g. snow or ice. The problem in pressure drop detection, among others, involves making a distinction between a comparatively insignificant variation of the dynamic rolling radius due to a pressure drop and major variations of the dynamic rolling radius due to cornering maneuvers, acceleration, deceleration, and roadway effects (bump holes, different coefficients of friction).

BRIEF SUMMARY OF THE INVENTION

An object of the present invention is to provide a more reliable pressure drop detection on the basis of wheel speed data.

According to the present invention, this object is achieved by a method of detecting tire pressure drop in motor vehicles including the following steps:

a) producing at least two differently determined reference values $Ref_i$ which are produced from at least two wheel speed data of the group left front wheel VL, right front wheel VR, left rear wheel HL, and right rear wheel HR, b) detecting a preliminary pressure drop by checking whether at least one reference value $Ref_i$ includes a predetermined minimum deviation from a nominal value $S_i$ for this reference value, c) considering a final detection of a pressure drop to prevail in dependence on one or more methods for checking the plausibility and a device for controlling the brake force and/or the driving dynamics and for detecting a pressure drop of tires in a motor vehicle, wherein a microcomputer which is connected to wheel speed sensors and, if necessary, additional driving dynamics sensors processes a method as described above and a per se known method for controlling the brake force and/or driving dynamics.

Initially, the following steps are performed according to the method of the present invention:

a) producing at least two differently determined reference values $Ref_i$ which are produced from at least two wheel speed data of the group left front wheel VL, right front wheel VR, left rear wheel HL, and right rear wheel HR.

b) detecting a preliminary pressure drop by checking whether at least one reference quantity $Ref_i$ includes a predetermined minimum deviation from a nominal value for this reference quantity.

Subsequently, a final detection of a pressure drop (e.g. indication of a pressure drop alarm on the instrument panel) in dependence on one or more methods for checking plausibility is executed according to the present invention. The detection is additionally secured by this additional method. In case wrong failure signalings occur in steps a) and b), the predominant number of wrong failure signalings may be avoided by the plausibility check.

It is preferred that the predetermined minimum deviation is predefined by top and bottom limit values $G_1$, $G_2$ while it is monitored whether these limit values are exceeded. The limit values can be produced by adding a suitable value to the nominal value, or by subtracting the said value from the nominal value.

The method of the present invention for measuring the pressure of vehicle tires is preferably implemented within a method of controlling the brake force and/or the driving dynamics (ABS, TSC, ESP).

The wheel rotational speed data is e.g. speed data of wheel speeds determined by sensors, or data indicating wheel speeds on the basis of time intervals. Preferably, the wheel speed data concerns data of currently determined wheel radii (dynamic wheel radius $r_d$), which can be established according to the formula $r_d = v_{ref}/\omega$, wherein $v_{ref}$ is the vehicle speed determined by the electronic brake system.

The nominal values with which the reference values are compared can be invariably fixed or learnt by means of a per se known learning method. WO 98/52780 e.g. describes a learning method that may be implemented according to the present invention. The purpose of the learning method that is preferred in application is to compensate for different running properties of the wheels which may occur due to different wear of the tires or different wheel diameters. An objective is to gather the data that is taken into consideration in the learning period during straight travel, if possible, when all wheels move at the same speed in relation to the underground. The learnt data can be averaged and stored as a nominal value. Following this action, the period of comparison can be performed according to steps a) and b).

To check the plausibility of a preliminary pressure drop which is detected according to steps a) and b), preferably, the amount of the deviation of a first reference value from a nominal value that is preferably learned, $|\Delta \text{Ref}_{f1}|=|\text{Ref}_{f1}-S_{f1}|$ and the amount of the deviation of another reference value from another nominal value $|\Delta \text{Ref}_{f2}|=|\text{Ref}_{f2}-S_{f3}|$ are compared to one another.

It may be expedient for the method that the reference values of the preliminary pressure drop detection in the steps a) and b) are produced in the same manner as the reference values in the plausibility check. However, this is not absolutely necessary. Therefore, it may also be provided that reference values are applied in the preliminary pressure drop detection that are determined in a different fashion than for the plausibility check.

Preferably, pressure drop is considered as plausible according to the present method if the quotient of the amount of the deviation $|\Delta \text{Ref}_{f1}|/|\Delta \text{Ref}_{f2}|$ is smaller than the value of 1 plus or minus a predetermined threshold value SP (1*SP, 1/SP). Values higher than 1 are appropriate for SP.

It is not always appropriate to compare all possible differently produced reference values in the manner described hereinabove. Preferably, only such pairs of a first and a following deviation $|\Delta \text{Ref}_{f1}|$ and $|\Delta \text{Ref}_{f2}|$ are compared to each other which jointly contain the rotational speed information of a wheel with an assumed pressure drop as parameters.

If, for example, the reference values are calculated from the conditions of the wheel radii, such as according to the formulas VL/VR, VL/HR, VR/HL, VR/HR, HL/HR, VL/HL, or their reciprocal values, it is suitable to only compare the three reference values VL/VR, VL/HL, VL/HR with each other, if the wheel VL is a wheel where a preliminary pressure drop was identified.

In a particularly favorable manner, it is checked whether the other quotients which do not contain the identified wheel exhibit deviations lie outside the range.

The reference values $\text{Ref}_1$ are e.g. mathematical functions in which the data of the wheel rotational speed concern function parameters as indicated exemplarily hereinbelow:

$\text{Ref}_1=(VL+HR)/(VR+HL)$ (ratio of diagonals)

$\text{Ref}_2=(VL+HL)/(VR+HR)$ (ratio of sides)

$\text{Ref}_3=(VL+VR)/(HL+HR)$ (ratio of axles)

The functions which can be described in general by the expression $\text{Ref}_i=F(A, B, C, D)$ will differ from each other either by a different mathematical function F or by a different arrangement of the function parameters A, B, C and D.

The different reference values $\text{Ref}_i$ are preferably calculated by means of the same mathematical function $\text{Ref}_i=F$ (VL, HR, VR, HL) or, respectively, also $\text{Ref}_i=F(VL, HR)$, the functions differing from each other by a different arrangement of the function parameters.

When producing the reference values, e.g. the formula $\text{Ref}_1=F(VL, HR, VR, HL)$ or the formula $\text{Ref}_2=F(VL, HR, HL, VR)$ can be used. In the list of parameters of the function, the wheel parameters are permuted. In general, 24 possibilities for permutation result with four wheels.

As has been described hereinabove, function F may also be selected differently. Favorably, such functions are suitable which permit calculating a ratio value from the wheel speed data. Hereinbelow will follow some examples for appropriate functions F:

$F_1=(A+B)/(C+D)$, $F_2=(A/B)-(C/D)$, $F_3=(A+B)-(C+D)$ $F_4=(A/B)$ $F_5=(A/B)/(C/D)$ or $F_6=(A/(A+B+C+D)$.

In a particularly favorable manner, the function F is chosen such that deviations of the wheel rotational speed become apparent in a very conspicuous way. This is advantageous because the storage of the reference values in rendered possible with a comparatively low demand in memory locations, while a sufficient sensitivity of the reference value with regard to relative deviations in the rotational speed of individual wheels is safeguarded at the same time.

The reference value Ref is preferably formed to determine the preliminary pressure drop by dividing the sums of respectively two signals representative of the wheel rotational speeds.

The present invention also relates to a device for controlling the brake force and/or the driving dynamics and for detecting a pressure drop in wheels of a motor vehicle which is characterized by that a microcomputer, which is connected to wheel speed sensors and, as the case may be, additional driving dynamics sensors, processes the above-described method jointly with a per se known method for a control of the brake force and/or driving dynamics. Because the method of the present invention generally requires only devices which are already provided in a conventional ABS, TCS, or ESP system, the said method may be integrated into a system of this type in a favorable and low-cost manner.

Preferably, the device is so configured that, after detection of a pressure drop, it outputs a signal e.g. by way of a line or a data register which contains the information 'pressure drop'.

The method for pressure drop detection described hereinabove may especially be extended by the following method, which is another favorable embodiment of the present invention, with a view to improving the accuracy during driving on roadways with a low coefficient of friction $\mu$ (e.g. on ice or snow). When driving on ice or snow is detected by an excessive data noise, it is possible to discontinue the processing of data in the pressure drop detection algorithm. Alternatively, it is also possible to only suppress the execution of the learning period for the duration of the noise.

In addition, the following process steps for detecting noise in the reference values are carried out:

a) storing a reference value, especially with a ratio of the diagonal wheel speeds, in a memory $\text{Ref}_i^{Old}$, b) determining a new reference value $\text{Ref}_i$ afer a defined time and finding out whether $\text{Ref}_i$ differs by a fixed minimum amount from $\text{Ref}_i^{Old}$, and storing this new value $\text{Ref}_i$ in $\text{Ref}_i^{Old}$, c) resetting a counter to a start value if condition (b) is satisfied, otherwise, if the condition is not satisfied, continuous counting operation of the counter by a defined amount, d) executing the steps (a) and (b) with wheel speed information originating from the wheels of the non-driven axle of the vehicle, e) resetting another counter to a start value if condition (b) is satisfied, otherwise, if the condition is not satisfied, continuous counting operation of the counter by a defined amount, with wheel speed information of the non-driven axle being exclusively used in step (e), and f) suppressing the learning of reference values and/or using reference values in the period of comparison if a predetermined count of the counter used is not exceeded.

The term "continuous counting operation" means upward counting or downward counting. In particular, the counters used are counted downwards (decremented).

It may be expedient to allow at least detection of a pressure drop if only the noise detection at the non-driven axle signals data noise caused by a still counting counter.

Preferably, the reference values used for the noise detection are data not being filtered or averaged.

It is expedient that the noise detection described above is executed only if it is detected by means of a cornering detection method that the curve radius the vehicle follows is generally maintained or straight travel detected by the cornering detection method is generally maintained. Methods for the detection of a cornering maneuver are per se known. They may e.g. be realized by checking whether the yaw rate which, as the case may be, may be averaged based on several values or filtered, maintains a constant value or varies by no more than by a defined amount within the period of time decisive for the noise detection (when the counter is active). Alternatively, however, it is also possible for the same purpose to take into account transverse acceleration data of a transverse acceleration sensor for the determination of cornering maneuvers that is frequently provided in modern brake systems.

In addition, the wheel data itself can be used in cornering detection for this purpose.

In a particularly favorable fashion, a counter for noise detection is started in noise detection similarly to the steps (a) and (b), the said noise detection being based exclusively on data of wheel speed information originating from the wheels of the non-driven axle of the vehicle. The following steps shall be performed according to the embodiment described:

(c2) resetting another counter to a start value if condition (b) is satisfied, while using wheel speed information of the non-driven axle, (c3) continuous counting operation of the counter by a defined amount when the condition is not satisfied.

DETAILED DESCRIPTION OF THE PREFERRED EMBODIMENTS

First of all, the data memories of the device are reset to an initial condition by way of a resetting switch not shown. This is usually done by the driver of the motor vehicle after the tires have been inflated to the prescribed tire pressure. The learning period of pressure drop detection will follow subsequently.

In the learning period (and in the period of comparison) the angular velocities of the wheels are sensed by means of wheel sensors. Accuracy is enhanced by using the time value T as a standard for the wheel speed. A synchronization to a sensor edge may be effected this way. The advantage is an enhanced accuracy when determining the wheel speeds.

Reference values $Ref_i$ are produced from the wheels signals during driving, and nominal values $S_i$ for the period of comparison (step 12, FIG. 2) are generated in the learning period. The reference values are calculated from current values of wheel speed data of the wheels VL, VR, HL and HR according to the formula $$Ref_i = (A+B)/(C+D).$$

If all wheels had the same angular velocity under ideal conditions (straight travel), the magnitude of the reference value would be $Ref_1=1$. In the event of pressure drop, the reference value will differ by a defined amount from value 1.

It is subsequently checked whether the driving conditions lie in an allowable range. If there is a driving condition that makes it seem inexpedient to produce the reference values, e.g., if the longitudinal acceleration, the transverse acceleration, or the wheel acceleration exceed defined threshold values, no reference values are memorized. The reference values R(t) may be filtered or averaged for a period of time to suppress noise. The learnt average value of Ref is memorized in the variable $Ref^M$.

After completion of the learning period, top and bottom limit values $G_1$ and $G_2$ are fixed by adding an offset value to the determined average value of the reference values $Ref^M$, or by subtracting it therefrom.

Figure 2:
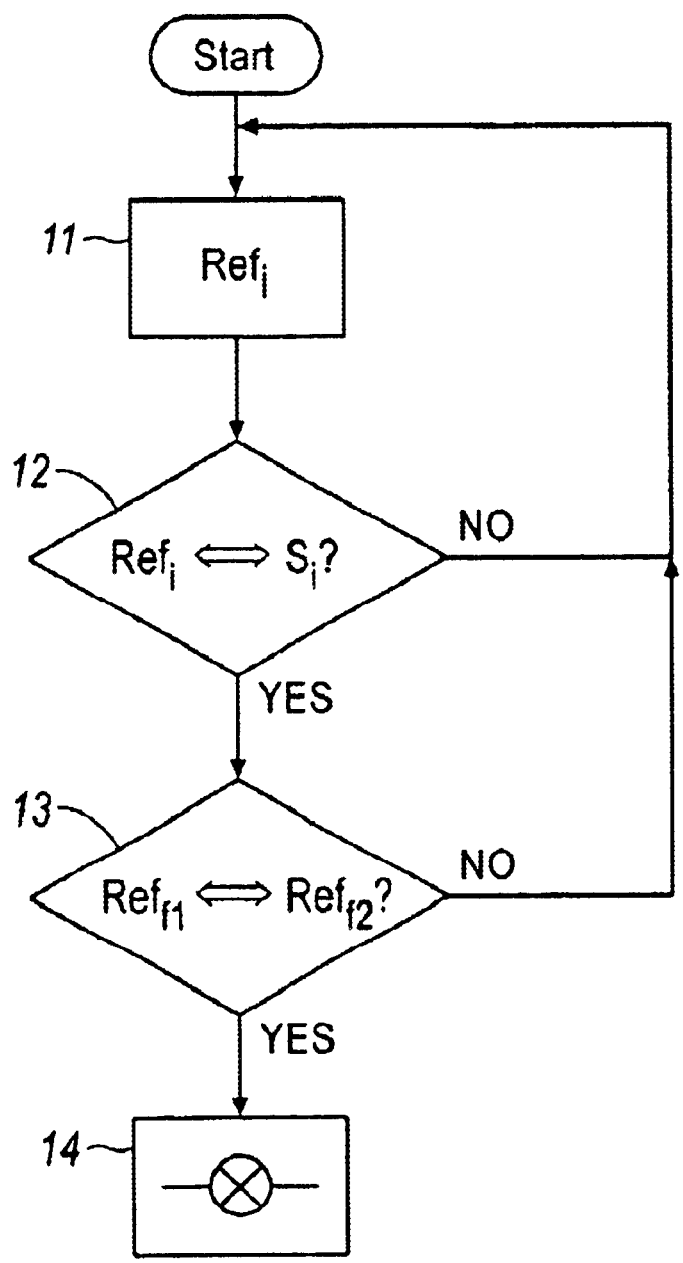
FIG. 2 is a flow chart for the method of the present invention for detecting a drop in pressure.

Once the learning period is completed, the period of comparison 11, 12, 13, 14 which is illustrated in FIG. 2 will start.

In the period of comparison (step 12), reference values that have been newly determined in step 11 are initially compared with the nominal values $S_i$. It is checked then whether the current filtered or unfiltered reference values satisfy the following equation:

$$_iG_1 <_i Ref <_i G_2.$$

If the formula is satisfied, there is a preliminarily detected pressure drop which still needs testing. Step 13 is used to this end and checks whether the preliminarily detected pressure drop is plausible.

To check plausibility, the difference is respectively calculated for $$Ref_1 = (VL+HR)/(VR+HL) \text{ (ratio of diagonals)},$$

$$Ref_2 = (VL+HL)/(VR+HR) \text{ (ratio of sides) and}$$

$$Ref_3 = (VL+VR)/(HL+HR) \text{ (ratio of axles)}$$

between the associated nominal values $S_1$, $S_2$, $S_3$ from the learning period according to the formula $|\Delta Ref_i| = |Ref_i - S_i|$.

Figure 1:
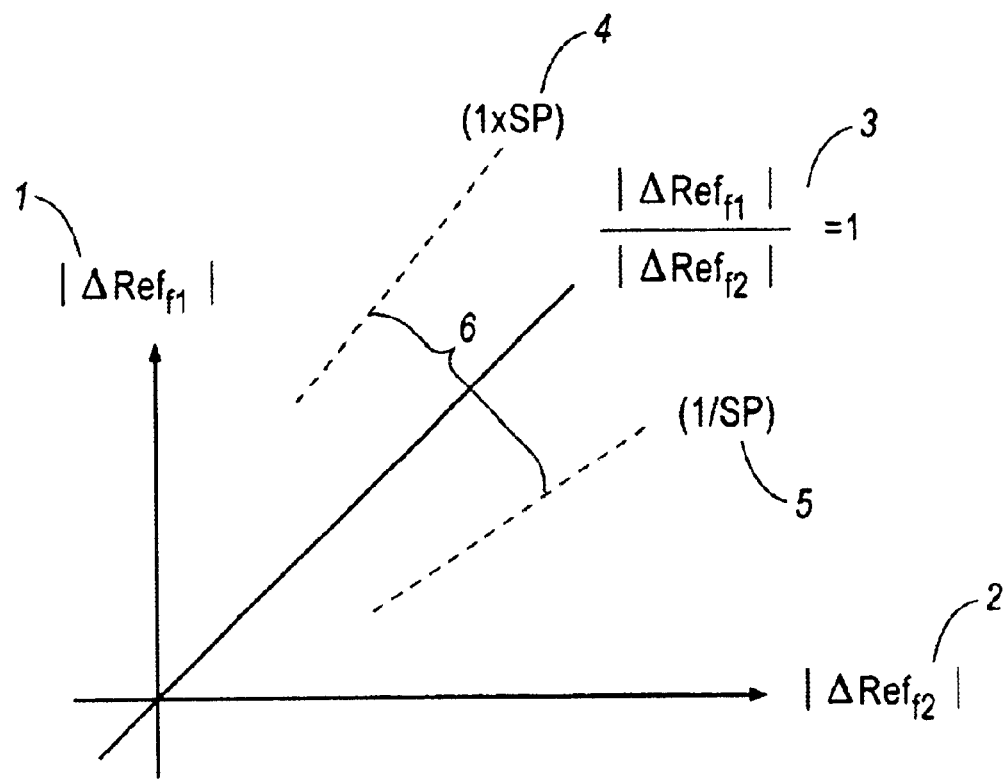
FIG. 1 shows a diagram for explaining the method for checking plausibility.

Two reference values $|\Delta Ref_1|$ and $|\Delta Ref_2|$ are compared to each other, as illustrated in FIG. 1 (reference numerals 1 and 2). In order that a pressure drop is plausible, among others, the difference between the diagonal wheels ($|\Delta Ref_1|$) must roughly correspond to the difference between the wheels on one side ($|\Delta Ref_2|$).

To this end, a range of limit values 6 is defined for the comparison; in the diagram according to FIG. 1 this is done by calculating the condition $$(1/SP) = |\Delta Ref_1|/|\Delta Ref_2| = (1*SP),$$

wherein SP exceeds 1. Appropriate values for SP can be determined in driving tests.

Reference numeral 4 shows the top limit of the gradient of quotient 3. Reference numeral 5 shows the corresponding bottom limit. When the quotient is outside range 6, there is no pressure drop. When the quotient is within range 6, this indicates a pressure drop.

If also the quotient $|\Delta Ref_2|/|\Delta Ref_3|$ indicates a pressure drop, the preliminary pressure drop is considered plausible.

If the pressure drop (which is detected in step 13) is plausible program control returns to step 11. If the detected pressure drop is not plausible program control moves to step 14 in which any number of actions can be taken to notify the vehicle operator (such as activating a dashboard lamp or the like).

What is claimed is:

1. Method of detecting pressure drop in the tires of motor vehicles comprising the steps of:
   A) producing at least two differently determined reference values which are produced from at least two wheel speed data of the group left front wheel VL, right front wheel VR, left rear wheel HL, and right rear wheel HR,
   B) detecting a preliminary pressure drop by checking whether at least one of said at least two differently determined reference values is included within a predetermined minimum deviation from a respectively associated nominal value,
   C) considering a final detection of a pressure drop to prevail in dependence on one or more methods for checking the plausibility,
   wherein step A) includes the following substeps of:
   (a) storing an old reference value in a memory,
   (b) determining a new reference value after a predetermined defined time,
   (c) determining whether the new reference value deviates from the old reference value by a fixed minimum amount, and storing the new reference value in the memory associated with the old reference value,
   (d) resetting a counter to a start value if step (c) is satisfied, otherwise, if the condition of step (c) is not satisfied, continuously incrementing the counter by a defined amount,
   (e) suppressing the determination of new reference values of step (b), if a predetermined count of the counter used is not exceeded.

2. Method as claimed in claim 1, wherein checking the plausibility includes the step of comparing the amount of the deviation of a first reference value of said at least two differently determined reference values from a respectively associated nominal value with the amount of the deviation of a second reference value of said at least two differently determined reference values from a respectively associated nominal value.

3. Method as claimed in claim 2, wherein checking the plausibility includes the step of determining if the quotient of the deviations is smaller than a predetermined positive threshold value.

4. Method as claimed in claim 3, wherein checking the plausibility includes the step of determining pairs of a first and a second deviation which jointly share the rotational speed information of a common wheel.

5. Method as claimed in claim 1, wherein the different reference values are calculated by means of a same mathematical function and differ from each other by an interchange of wheel speed information values in a list of parameters of the mathematical function.

6. Method as claimed in claim 1, further including the additional step of:
   D) controlling the brake force or the driving dynamics of the motor vehicle in response to a determination that a pressure drop prevails.

7. Method as claimed in claim 1, including the additional step of:
   filtering the reference values only if it is detected by means of a cornering detection method that the curve radius the vehicle follows is generally maintained or straight travel detected by the cornering detection method is generally maintained.

* * * * *